Sheet 1, 2 Sheets.
G. Goewey.
App. for Treating Spirituous Liquors.
No. 91,840. Patented Jun. 29, 1869.
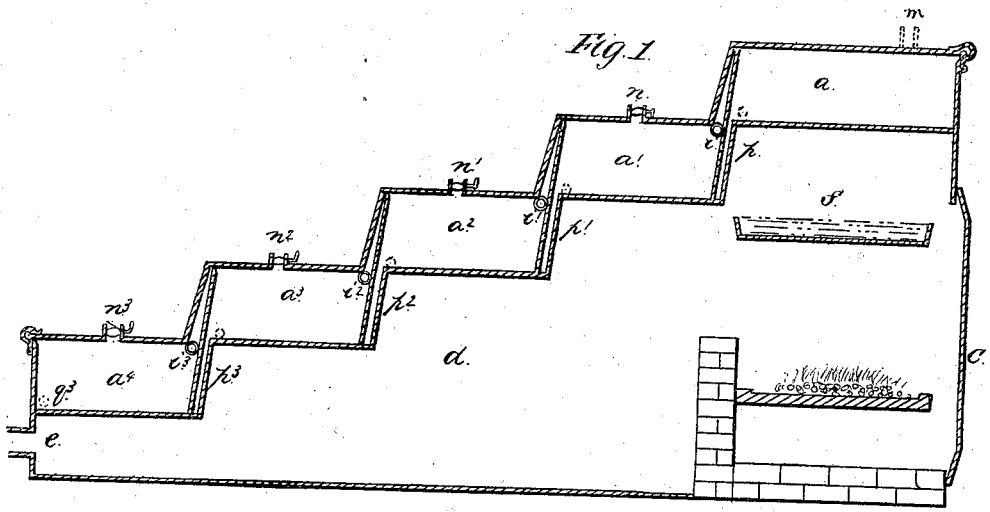
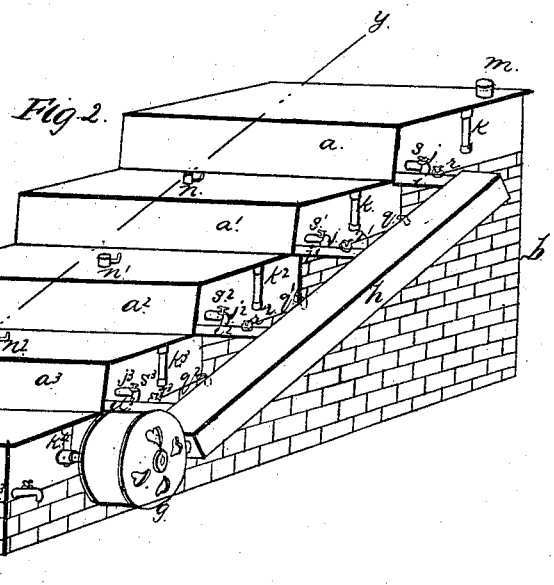
Witnesses.
George E. Bickley
W. A. a. McKuelly
Inventor
George Goewey

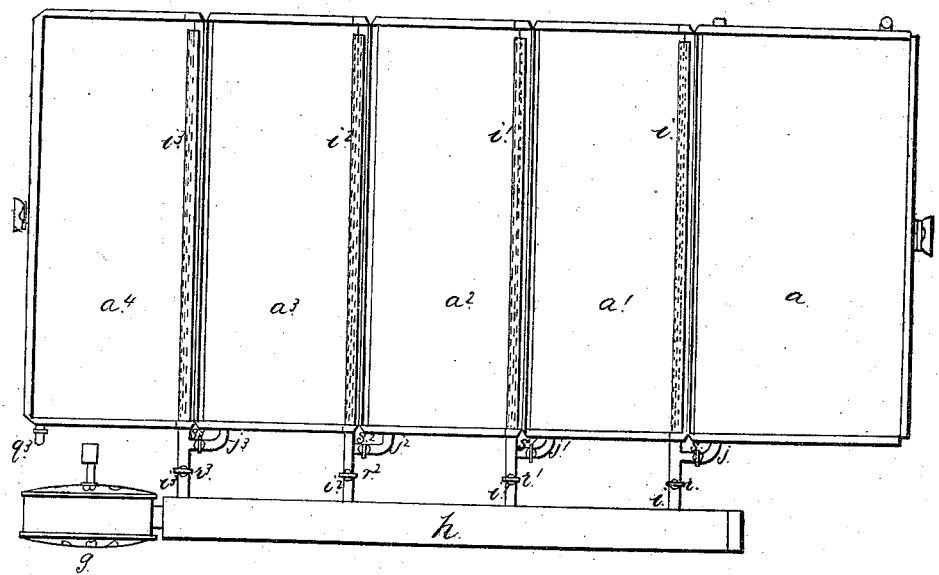

United States Patent Office.

GEORGE GOEWEY, OF PHILADELPHIA, PENNSYLVANIA.

Letters Patent No. 91,840, dated June 29, 1869.

---

IMPROVED APPARATUS FOR TREATING AND AGEING SPIRITUOUS LIQUORS.

---

The Schedule referred to in these Letters Patent and making part of the same.

---

*To all whom it may concern:*

Be it known that I, GEORGE GOEWEY, of Philadelphia, Pennsylvania, have invented a new and useful Process and Apparatus for Purifying Whiskey, Wine, and other Alcoholic Liquors; and I do hereby declare that the following is a full and exact description of the same, reference being had to the annexed drawings, forming part hereof, and to the letters of reference marked thereon, in which drawings—

Figure 1 is a longitudinal vertical section of said apparatus, on the line $x\, y$ of fig. 2;

Figure 2, a perspective view of said apparatus; and

Figure 3, a top view of the same, the tops of the several close pans or vessels employed being removed, to disclose the interior structure of such vessels.

My process consists in forcing the liquor into thorough and intimate contact with atmospheric air, by causing a stream of the liquor, heated to a temperature of from 115° to 165° Fahrenheit, to come into confluence with a forced stream of air, the latter being, preferably, at a temperature not exceeding 100° Fahrenheit, the mixed stream of liquor and air being, together, forced into a finely-perforated cylinder, or other vessel, and through the perforations thereof, in the form of spray or vapor, into a proper receiver.

Referring to the drawings—

$a\, a^1\, a^2\, a^3\, a^4$ represent shallow pans or vessels, closed, except as to apertures hereinafter described, and arranged in a descending series, as shown, so that the liquors shall tend to pass, by gravity, from the pan $a$ into the air-pipe leading into the pan $a^1$, thence to the air-pipe leading into pan $a^2$, and so on, to the last pan in the series.

These pans may rest on masonry, $b$, which encloses an ordinary furnace, $c$, and a passage-way, $d$, under said pans, for the gaseous products of combustion, which arise from the furnace-fire, and escape through an aperture, $e$, by a pipe, or other sufficient means, into a chimney.

An open pan, $f$, containing water, is located in the furnace, over the fire, and between it and the bottom of pan $a$, to partially screen the latter from the direct influence of the fire.

$g$ is a fan-blower.

$h$ is a box or conduit, into which air is forced by the blower $g$.

$i\, i^1\, i^2\, i^3$ are pipes, each of about one and a-half inch bore, which extend from the air-box $h$ into and across the pans $a^1\, a^2\, a^3\, a^4$, as shown in figs. 2 and 3.

$j\, j^1\, j^2\, j^3$, figs. 2 and 3, are pipes, each of about half an inch bore, to convey the liquor from pan $a$ into pipe $i$, from pan $a^1$ into pipe $i^1$, and so on, to the end of the series, as shown.

These pipes, $i$, &c., so far as they are enclosed by the pans, are finely perforated, as shown in fig. 3, the perforations being made from within outwardly.

$k\, k^1\, k^2\, k^3\, k^4$ are ordinary gauges, to indicate the height of the liquor in vessels $a\, a^1$, &c.

$m$ is an aperture, which should be provided with a stop-cock, through which the vessel $a$ is charged with the liquor to be treated.

$n\, n^1\, n^2\, n^3$ are apertures in the pans $a^1\, a^2\, a^3\, a^4$, respectively, for the escape of the gases and vapors which arise from the liquor in said pans.

The apertures $n\, n^1$, &c., respectively, are provided with stop-cocks, and connected, by proper pipes, with a condensing-worm, not shown, in the passage of the vapors through which, any spirits which arise from the pans $a\, a^1$, &c., are condensed, and thus saved.

The pans $a\, a^1\, a^2\, a^3$ have projections, $p\, p^1\, p^2\, p^3$, respectively, which partially screen said pans from the direct influence of the furnace-fire.

$q\, q^1\, q^2\, q^3$ are stop-cocks, by which the pans are completely drained, when desired.

$r\, r^1\, r^2\, r^3$ are stop-cocks in pipes $i\, i^1\, i^2\, i^3$, and $s\, s^1\, s^2\, s^3$ are stop-cocks in pipes $j\, j^1\, j^2\, j^3$.

The process is applied as follows, viz:

The pan $a$ is charged with liquor, through the aperture $m$, which is then closed. A gentle fire is started in the furnace, the vessel $f$ being supplied with water. The charge of liquor is kept in pan $a$ until the liquor reaches a temperature of from 115° to 165° Fahrenheit. The fan-blower being then put in motion, and the stop-cock $s$ opened, the liquor is allowed to flow from pan $a$ into the air-pipe $i$, and is drawn and forced with the air, by means of the strong current from the blower, through the fine perforations of the pipe $i$ into the pan $a^1$. The liquor and air are thus brought into thorough and intimate contact. When sufficient of the contents of pan $a$ have thus passed into pan $a^1$ to fill it about three parts full, the stop-cock $s^1$ is opened, and the liquor allowed to flow into the air-pipe $i^1$, and is forced and drawn with the air, by means of the strong current from the blower, through the fine perforations of the pipe $i^1$ into the pan $a^2$. The stop-cock $s^2$ being then opened, the liquor is allowed to pass, in a similar manner, from the pan $a^2$ into the pan $a^3$, and so, to the last pan of the series, when the liquor is drawn off and barrelled for use.

I prefer that the charge of liquor should be about twenty hours in passing through the apparatus.

Instead of heating the liquor, and introducing into it air, at a lower temperature, as described, this part of the process may be reversed, the air being heated to a temperature of from 115° to 165° Fahrenheit, and the liquor brought to a temperature of from 50° to 100° Fahrenheit, the method of treatment being, in other respects, similar to that first described.

It is obvious that this process of purifying liquors could be carried on without more pans than the two marked $a$ and $a^1$, the liquor being returned from the pan $a^1$ into the pan $a$, and the operation repeated the desired number of times.

The pans and pipes are made of copper, and the pans may be of any desired number and size; but I prefer to use five pans, and to make them of capacity to hold about five barrels each, or about six feet long, five feet wide, and ten inches high.

Liquors treated in the manner described, have, at the end of the operation, the softness and mellowness of ordinary liquors several years of age.

Having thus described my invention,

I claim, and desire to secure by Letters Patent—

1. The process of bringing alcoholic liquors into thorough and intimate contact with atmospheric air, by causing the liquors, at a temperature of from 115° to 165° Fahrenheit, to come into confluence with a forced current of air, at a temperature not exceeding 100° Fahrenheit; or, *vice versa*, by causing the liquors, at a temperature not exceeding 100° Fahrenheit, to come into confluence with a forced current of air, at a temperature of from 115° to 165° Fahrenheit, the air carrying the liquors into a finely-perforated pipe, or other vessel, and forcing the liquors to pass, together with the air, through the perforations of the pipe or vessel, in the form of fine spray or vapor, into a receiver, substantially as set forth.

2. The combination of the pans $a$ $a^1$ $a^2$ $a^3$ $a^4$, pipes $j$ $j^1$ $j^2$ $j^3$, perforated air-pipes $i$ $i^1$ $i^2$ $i^3$, air-chest $h$, and fan-blower $g$, substantially as shown and described, for the purpose specified.

GEORGE GOEWEY.

Witnesses:
  GEORGE E. BUCKLEY,
  WM. ALBT. ALEX. MCKINLEY.